(12) United States Patent
Danilov et al.

(10) Patent No.: US 12,140,567 B2
(45) Date of Patent: Nov. 12, 2024

(54) METHOD FOR DETERMINING THE GEOMETRY OF AN OBJECT BASED ON DATA FROM NON-DESTRUCTIVE MEASURING METHODS

(71) Applicant: ROSEN SWISS AG, Stans (CH)

(72) Inventors: Andrey Danilov, Stans (CH); Matthias Peussner, Westerkappeln (DE)

(73) Assignee: ROSEN Swiss AG, Stans (CH)

( * ) Notice: Subject to any disclaimer, the term of this patent is extended or adjusted under 35 U.S.C. 154(b) by 357 days.

(21) Appl. No.: 17/602,950

(22) PCT Filed: Apr. 9, 2020

(86) PCT No.: PCT/EP2020/060188
§ 371 (c)(1),
(2) Date: May 16, 2022

(87) PCT Pub. No.: WO2020/208154
PCT Pub. Date: Oct. 15, 2020

(65) Prior Publication Data
US 2022/0308018 A1  Sep. 29, 2022

(30) Foreign Application Priority Data

Apr. 9, 2019 (EP) .................................... 19168281
Apr. 10, 2019 (EP) .................................... 19168532

(51) Int. Cl.
*G01N 29/24* (2006.01)
*G01N 27/82* (2006.01)
*G01N 29/44* (2006.01)

(52) U.S. Cl.
CPC ......... *G01N 29/2412* (2013.01); *G01N 27/82* (2013.01); *G01N 29/4427* (2013.01); *G01N 29/4436* (2013.01)

(58) Field of Classification Search
None
See application file for complete search history.

(56) References Cited

U.S. PATENT DOCUMENTS 6,541,964 B1    4/2003  Jourdain et al.
8,788,219 B2 *  7/2014  Fingerhut ............. G06T 7/0004
                                                          702/38

(Continued)

*Primary Examiner* — Jermele M Hollington
(74) *Attorney, Agent, or Firm* — Husch Blackwell LLP

(57) ABSTRACT

A method is provided for determining the geometry of a metallic object, with in particular one or more real, examined defects, with a reference data set of the object generated on the basis of at least one measurement by at least one non-destructive measuring method, preferably comprising an at least partial representation of the object on or by an at least three-dimensional object grid by means of a computer unit. A classification of anomaly-free areas and anomaly-affected areas of the object is performed on the basis of at least parts of the at least one reference data set. An initial object grid is created, a prediction data set of the at least one non-destructive measurement method is calculated by a simulation routine using the initial object grid, at least parts of the prediction data set are compared with at least parts of the at least one reference data set, excluding the anomaly-afflicted regions, and the initial object grid is used as an object grid describing the geometry of the object as a function of at least one accuracy measure, or the initial object grid is iteratively adapted to the geometry of the object in the anomaly-free regions by means of the EDP unit.

15 Claims, 5 Drawing Sheets

(56) References Cited

U.S. PATENT DOCUMENTS

| | | | |
|---|---|---|---|
| 10,244,967 B2* | 4/2019 | Schubert | G01B 11/14 |
| 11,624,728 B2* | 4/2023 | Danilov | G01N 33/2045 |
| | | | 702/38 |
| 2006/0293776 A1* | 12/2006 | Hillman | G05B 19/4099 |
| | | | 700/98 |
| 2016/0187523 A1 | 6/2016 | Sanmartin et al. | |
| 2016/0245779 A1* | 8/2016 | Khalaj Amineh | E21B 47/00 |
| 2017/0191361 A1 | 7/2017 | Khalaj Amineh et al. | |
| 2018/0165841 A1* | 6/2018 | Tholath | G06T 3/60 |
| 2020/0340948 A1* | 10/2020 | Danilov | G01N 33/2045 |
| 2022/0163325 A1* | 5/2022 | Danilov | G01N 27/9046 |
| 2022/0277113 A1* | 9/2022 | Schwaderer | G06F 30/25 |
| 2023/0091681 A1* | 3/2023 | Danilov | G01N 29/4436 |
| | | | 702/35 |
| 2023/0258599 A1* | 8/2023 | Danilov | G01N 27/83 |
| | | | 702/38 |

* cited by examiner

METHOD FOR DETERMINING THE GEOMETRY OF AN OBJECT BASED ON DATA FROM NON-DESTRUCTIVE MEASURING METHODS

CROSS REFERENCE

This application claims priority to PCT Application No. PCT/EP2020/060188, filed Apr. 9, 2020, which itself claims priority to EU patents application Ser. Nos. 19/168,281.4 and 19168532.0, filed Apr. 9, 2019 and Apr. 10, 2019, respectively, the entireties of all of which are hereby incorporated by reference.

FIELD OF THE INVENTION

The invention relates to a method for determining the geometry of a metallic, in particular magnetizable object, in particular a pipe or a tank.

BACKGROUND

Such objects are examined for defects using non-destructive measuring methods. The results of the measuring methods are evaluated to infer the type and/or size of defects. It can then be determined on this basis how heavily the object can be loaded, for example, or whether and to what extent repair measures or replacement of the object are necessary. To prevent unnecessary measures, it is important to be able to describe the defects and their geometry as precisely as possible.

An example of such an object to be examined is a pipeline. One of the essential tasks of pipeline inspections, especially with so-called intelligent pigs, is the prediction of safe operating conditions which result from the condition of the pipeline. Particularly, pipeline operators are interested in the condition of any welds and the number and size of defects, based on which a load limit and, depending on this, a maximum operating pressure can be set. The so-called "burst pressure," i.e. the pressure above which a pipeline is destroyed, is used to quantitatively determine the load limit. Defects are, for example, areas with metal losses due to corrosion, cracks, or other weaknesses in a wall of an object provided in particular for the storage or transport of liquid or gaseous media. These include, for example, pipes, pipelines, or tanks.

Various non-destructive measuring methods can be used. While MFL examinations under consideration of the magnetic flux leakage density (MFL measuring methods) are preferably used for the detection of defects due to corrosion, other methods, particularly methods using ultrasound, are used for detecting cracks on the inner or outer side of an object. These non-destructive measuring methods include electromagnetic-acoustic methods (EMAT methods), in which sound waves, particularly in the form of guided waves, are generated in the pipe wall of the object to be examined due to eddy current-induced magnetic fields, as well as methods directly introducing ultrasound into the object wall, hereinafter referred to as ultrasonic methods or UT methods. In the prior art, cracks close to the surface, particularly smaller cracks, are also searched for using eddy current measuring methods, hereinafter referred to as EC measuring methods.

It is state of the art for measuring the corrosion of an object to have scans of magnetic flux leakage data (MFL data) based on magnetic flux leakage measurements (MFL measurements) evaluated by specially trained people to determine the size of the (corrosion) defects. The same applies to the evaluation of measurement data obtained on the basis of EMAT, UT and EC measuring methods.

Automated evaluation of the measurement data of the non-destructive measuring methods is desirable to obtain an evaluation that is independent of the person performing the evaluation and preferably also faster and/or more reliable. The problem here is that the measurement results of the non-destructive measuring methods are not only changed as a result of defects, but also by local changes in the geometry of the object. These occur, for example, in the area of welds, attachments and/or installations of the object. These can be support structures attached to the object, brackets encompassing the object, measuring equipment attached to the object, shut-off equipment, and/or branching pipelines. Furthermore, sacrificial anodes may have been applied to the object as part of cathodic corrosion protection, or areas identified in previous inspections as having defects may have been reinforced with applied material. For automated treatment, it is necessary to be able to distinguish deviations due to such installations from deviations due to actual defects.

BRIEF SUMMARY OF THE INVENTION

The object is thus to provide a method by which a geometry for a subsequent automated analysis of defects can be created on the basis of measurement data from at least one non-destructive measuring method, and on the basis of which a load limit of an object can be determined.

A representation of the defect-free geometry of the object is created in the form of an object grid based on a reference data set of the object generated by at least one measurement by at least one non-destructive measuring method. This may include representations of welds and attachments and/or installations. Such a representation of the real object measured by means of non-destructive measuring methods is a suitable starting point for a subsequent determination of defects or defect geometries and the calculation of the remaining load capacity of the examined object.

The determination of the object grid can be carried out for the examined object in its entirety or only for individual partial areas. It is also possible to multiple individual partial areas in such a way that the respective evaluations of the partial areas as a whole correspond to an evaluation of the entire object under examination.

According to the invention, a classification of anomaly-free areas and anomaly-afflicted areas of the object is performed based on at least parts of the at least one reference data set. Anomaly-afflicted areas of the reference data set are spatial areas to which measurement data that differ significantly from neighboring areas are assigned. It is believed that these anomalies are due to defects. Anomaly-free areas are preferably contiguous areas in which the measured values measured by the non-destructive measuring method do not change or only change within a specific tolerance range in which the gradient of the change remains below specific limit values, the deviation of individual measured values from a mean value is less than a specific threshold value, and/or the deviation of a mean value in a local area from the mean values of adjacent local areas is below a threshold value. Other criteria for classifying anomaly-free areas are conceivable. Anomaly-afflicted areas are then the remaining areas. Furthermore, the use of a neural network trained for this task is conceivable. Explicitly specified threshold values are not used here. Alternatively, a determination of the anomaly-afflicted areas can be performed, wherein the remaining areas then represent anomaly-free areas. These methods can also be combined.

By the method according to the invention, an initial object grid is created, using previously known information about the object, in the case of pipelines, for example, the pipeline diameter and the wall thickness. Based on the initial object grid, a simulation routine calculates a prediction data set of the at least one non-destructive measuring method. For this purpose, a virtual measurement is simulated using the non-destructive measuring method based on the initial object grid. Subsequently, at least parts of the prediction data set are compared to at least respective parts of the at least one reference data set, wherein the anomaly-afflicted areas of the reference data set or of the object are excluded from the comparison. If the compared data coincides with sufficient accuracy, the initial object grid is viewed as a sufficiently accurate representation of the actual shape of the defect-free object and can furthermore be used in other methods for evaluating the defects. Otherwise, an iterative adjustment of the initial object grid to the geometry of the object in the anomaly-free areas takes place in the EDP unit. For this purpose, a new initial object grid is created and the simulation routine calculates a new prediction data set for it. A comparison of at least parts of the new prediction data set with at least parts of the at least one reference data set, excluding the anomaly-afflicted areas, is performed to determine the match. This is repeated until a stop criterion for iterative adjustment is reached. The initial object grid then present is then used as the object grid describing the geometry of the object.

To obtain an initial object grid that represents the defect-free examined object in the evaluated section or in its entirety, information from the reference data set and/or the object grid is preferably interpolated or extrapolated from the anomaly-free areas into the anomaly-afflicted areas. For example, after the classification of the reference data set into anomaly-afflicted and anomaly-free areas, the information from the anomaly-free areas can be interpolated and/or extrapolated into the anomaly-afflicted areas and an auxiliary reference data set obtained in this way can be used for determining the object grid. It is also conceivable to initially create an object grid only for the areas classified as anomaly-free. This object grid has gaps in the anomaly-afflicted areas, which gaps can then be closed by means of interpolation or extrapolation from the anomaly-free areas. In this way, an object grid representing the geometry of the object is obtained, which can then be used for further analyses of defects or defect geometries in the anomaly-afflicted areas.

It is also conceivable to carry out the procedure only in sections and then to combine these sections to form an object grid. It may also be sufficient to create only a local object grid in a specific environment around an anomaly-afflicted area to subsequently perform a determination of the defect geometry on this local object grid.

The method according to the invention is carried out completely and particularly in an automated manner on an EDP unit, which can optionally consist of multiple computers. The associated computer program can be a single program or it can be a program package comprising a plurality of program modules which, for example, run on different EDP systems or subunits depending on resources and can be stored there on respective EDP media. In particular, a computer has the typical means of a data processing unit, such as one or more processors, at least temporary memories (RAM), data communication means, display and/or input units.

Preferably, the simulation routine is set up by specifying parameters representing material properties of the object, the geometry of a sensor used in the non-destructive measuring method, the distance of the sensor from the object surface, and/or operating conditions of the sensor. The simulation routine must be adjusted to the specific problem to be solved to be able to calculate reliable solutions. For this purpose, a measurement is often performed with the respective non-destructive measuring method on an object with known geometry. A virtual measurement run is simulated by the simulation routine with this known geometry. The simulation routine can be considered to be set up if the differences remain below a certain limit when comparing the recorded measured values and the simulated measured values. The simulation routine then outputs sufficiently reliable results. The setup of the simulation routine can be set up by iteratively changing one or more parameters. To set up the simulation routine, parameters can be specified that represented known properties of the object to be measured or the measuring method used. For example, the operating conditions may take into account the feed rate of the sensor, the magnetic field strength for magnetic sensors, the excitation frequency for ultrasonic sensors, and/or the characteristics of a coupling medium. This can simplify and speed up the setup of the simulation routine.

Preferably, the classification into anomaly-free areas and anomaly-afflicted areas is based on at least parts of at least two reference data sets obtained by different non-destructive measuring methods. Classification can be performed simultaneously on both reference datasets or sequentially. For this purpose, the data sets must be prepared in such a way that they match with respect to their location information. Then it is ensured that a defect measured in both measuring methods can also be identified as the same defect. The combination of parts of reference data sets obtained by two different non-destructive measuring methods allows a more reliable classification.

Some measuring methods are more sensitive to specific defects than others. While MFL measuring methods as well as EC measuring methods are particularly well suited for detecting surface defects such as corrosion, the ultrasonic-based EMAT and UT measuring methods are particularly well suited for detecting cracks and other structural changes inside a wall of the object. Thus, by combining reference data sets obtained by different non-destructive measuring methods, the accuracy of the classification can be increased. Anomaly-afflicted areas that would not necessarily have been detected as such in one measuring method can still be excluded by the reference data set of the other measuring method, if necessary. This improves the creation of an object grid in the anomaly-free areas.

Preferably, the aforementioned MFL, EMAT, UT, and EC measuring methods are used as non-destructive measuring methods. Particularly preferably, a first reference data set generated based on an MFL measuring method, particularly with axial or circumferential magnetization, and at least one other reference data set generated based on an eddy current, EMAT, or ultrasonic measuring method are used in the method. If a measuring method such as an EMAT method generates a data set with several sub-data sets, for example due to sensors recording several signals, then preferably all sub-data sets are used in the method. In the case of reference data obtained using EMAT methods, the reference data sets are preferably amplitudes ("counts") integrated over time at the respective wall positions or measurement positions, the so-called A-scans.

The following combinations of measuring methods are particularly preferred:
- a first reference data set based on an MFL measurement and another reference data set based on an EMAT measurement, or
- a) a first reference data set based on an MFL measurement and another reference data set based on an UT measurement, or
- b) a first reference data set based on an MFL measurement, another reference data set one based on an EMAT measurement, and another reference data set based on an EC measurement.

The reference data sets generated on the basis of MFL measurements can preferably be further differentiated with respect to the direction of magnetization.

In the classification, an anomaly-free area is preferably assigned to at least one predefined local element of the object. This is used when creating the initial object grid or inserted into the initial object grid. This step simplifies the process of creating an initial object grid. As described above, the object examined by means of the non-destructive measuring method can contain weld seams, installations and/or attachments, or have a locally modified geometry that is otherwise previously known. The creation of the object grid can be facilitated if this previously known information is used. For this purpose, respective elements, such as weld seams, attachments such as support elements, brackets, reinforcing elements or, for example, sacrificial anodes of a cathodic rust protection, as well as sleeves attached for repair purposes, are predefined in their shape and/or extension. The measurement results of the non-destructive measuring methods naturally look different in these areas than in areas of an unchanged wall of the object, for example the pipeline wall in the case of pipelines. However, these changes are uniform and large in area compared to most defects. Furthermore, they can be expected because the position of the elements causing the change is known. For pipeline operators, the weld seams are of particular interest, since they are regularly found in pipelines. In addition to the shape of the weld seams, a subsequent examination or evaluation for defects in the area of a weld seam is particularly interesting. So far, this cannot be carried out or takes a great effort.

An identification can be carried out in the classification by specifying the local elements, as to whether these are, for example, a weld seam or a support structure. The element identified in this way can then be used with its known general shape or general dimensions when creating the initial object grid, or it can subsequently be inserted at the appropriate points into the initial object grid to adjust it to the actual shape of the examined object.

The respective local element is particularly preferably described by means of a parametric geometry model. This can significantly reduce the effort involved in creating the object grid. The previously known information about the local element is used for this purpose. A weld seam can be known, for example, as extending in the circumferential direction around the object and can be described with sufficient accuracy by a weld seam width and an elevation. A predefined parametric geometry model of a local element can thus be adjusted to the actual local shape of the object by varying just a few parameters. The process for creating an object grid is thereby significantly accelerated. Particularly in the case of an iterative adjustment of the initial object grid, only one or more parameters of the parametric geometry model can be changed. The variation of individual parameters can also be limited by specific limit values within which these can be modified. Such a limitation can minimize the risk of obtaining physically nonsensical results. The reliability of the method is increased.

Alternatively or additionally, an adjustment of the initial object grid can be performed by grid modification in the iterative method. In this case, the grid as such is preserved, particularly the connections of a grid point to its neighboring grid points or the grid elements. However, the position of a grid point or the distance to the neighboring grid points can be varied. Optionally, a grid division with the insertion of new grid points can also be carried out. Grid modifications can be performed with relatively little computational effort. The procedure can thus be carried out easily and quickly. In addition, the general topology of the grid is known. Furthermore, grid elements can be used that are less suitable for free, automatic grid creation.

Alternatively, the initial object grid can be created by computing a new grid within a modified contour of the initial object grid during iterative adjustment. In this case, only the edge points of the object grid are moved and a new object grid is created. The simulation routine calculates a new prediction data set based on the new object grid. Such a method is more processor-intensive, but allows for the treatment of object grids that require significant deformation in iterative processes or have holes, for example.

Preferably, the obtained object grid is then used to determine defect geometries in the anomaly-afflicted areas. The use of an object grid obtained according to the method of the invention in the determination of a defect geometry allows defect geometry determination also in areas of welds and/or attachments or installations of the object. Automated evaluation is difficult in these areas without creating an appropriate object grid. An automated evaluation procedure must recognize whether a deviation of the measurement results from simulated measurement results of an expected object geometry, for example a simple pipe shape in the case of pipelines, is due to defects or to modification of the measurement results by welds or attachments or installations. In addition, for the determination of defects in these areas, it must be known which portion of the changes is due to the installations and/or attachments or welds and which is due to defects located in these areas. These problems can be efficiently addressed by using the object geometry determined by the method of the invention in a subsequent method for determining the defect geometry in an object. Thus, in a downstream process, the method according to the invention enables the detection of defect geometries in areas that would otherwise not be accessible to machine evaluation.

According to a further development of the invention, the geometry of one or more defects is determined by means of at least two reference data sets generated on the basis of different, non-destructive measuring methods, wherein at least one, preferably a plurality of particularly competing expert routines, each with at least one separate search strategy or at least one algorithm of its own, use an identical initial defect geometry. The expert routines are executed particularly in parallel on one EDP unit. If a single expert routine is used, it can access various algorithms for adjusting the defect geometry.

The method determines the geometry of one or more real, examined defects of a metallic and in particular magnetizable object, in particular a pipe or a tank, by means of at least two reference data sets of the object generated on the basis of different, non-destructive measuring methods, Here, the object is at least partially displayed on or through the at least two-dimensional, preferably three-dimensional object grid obtained with the method according to the invention in an EDP unit.

According to an advantageous embodiment, the method according to the invention comprises a determination, particularly a generation, of a starting defect geometry as an initial defect geometry. The initial defect geometry can be mapped directly on the object grid or represented by it, but it can also be present in a parameter representation, for example on an at least two-dimensional defect grid.

Furthermore, a determination, in particular a generation, of respective prediction data sets, that is to say data sets matching the non-destructive measuring method, is carried out to obtain initial prediction data sets on the basis of the common initial defect geometry. This is done by simulating or assigning a measurement that matches the respective reference data set.

Then an iterative adjustment of the initial defect geometry to the geometry of the real defect or defects takes place by means of the EDP unit, wherein this adjustment is preferably carried out by means of the at least one, preferably by means of the several expert routines that are in competition with one another and particularly run parallel to one another, wherein a respective expert defect geometry is generated in the or in respective expert routines by means of at least one own algorithm or own search strategy and on the basis of the initial defect geometry.

The expert routine has its own algorithm if at least one of the algorithms available to the expert routine for adjusting the defect geometry differs at least partially from the algorithms of another expert routine. Preferably, stochastic processes can be used to differentiate the algorithms of different expert routines. Each expert routine has at least one algorithm for adjusting the defect geometry; preferably, multiple algorithms are available to at least one expert routine. An algorithm based on stochastic processes can also be selected or specified within an expert routine.

Furthermore, a respective expert prediction data set is determined based on the respective expert defect geometry, in particular by simulation or assignment of a measurement that matches the respective reference data set, wherein the expert defect geometry on which the respective expert prediction data set is based is made available to at least one, preferably several and in particular all of the expert routines as a new initial defect geometry for further adjustment to the geometry of the real defect or the real defects, if the respective expert prediction data set is more similar to the respective reference data set than the corresponding initial prediction data set and/or at least one fitness function that takes into account two sets of expert prediction data is improved. Subsequently, i.e. for the next comparisons of the respective expert defect geometries with the new initial defect geometry in the iteration, the expert prediction data sets belonging to the new initial defect geometry are used as new initial prediction data sets.

A measure of the similarity can also be formed via the fitness function, such that in one embodiment variant, for example, a new initial defect geometry is provided by an expert routine for the further iteration steps if there is an approximation of only one of the simulated or assigned expert prediction data sets to the respective reference data set.

A simple comparison of the expert prediction data sets with the reference data sets based on the expert defect geometry results, for example, as follows:

$$E = \sum_i |Y_{cal}^i(x_1 \ldots x_n) - Y_m^i|,$$

wherein $Y_m^i$– is the (geometrically usually two-dimensional measurement data i signal) of the i-th measuring method and $Y_{cal}^i$– is the simulated signal of the associated measuring method. Furthermore, the defect geometries varied via one or more expert routines are referred to as $x_1 \ldots x_n$. The smaller E, the better the calculated defect geometries match those actually present.

The iterative adjustment by means of the expert routines takes place until an expert stop criterion is met. According to the invention, (assigned or in particular simulated) expert prediction data sets generated based on the same initial defect geometry are compared to the respective reference data sets in a measuring method-specific manner, thus avoiding the disadvantages of the separate evaluation known from the prior art. In the measuring method-specific comparison, for example, a simulated EMAT scan is compared to the EMAT reference data set obtained on the basis of the real measurement, a simulated MFL scan is compared to the MFL reference data set obtained on the basis of the real measurement, etc.

By accessing the same defect geometry and the overlapping of the geometries of different defects, the burst pressure of the examined object can be calculated at least 10%-20% more accurately and, for example, a pipeline can be operated with higher pressures. In addition, the examined object has to be inspected less often, e.g. by excavation, due to the automated, combined consideration of the reference data sets of different measuring methods and the resulting improved description of the defect geometries. In addition, the combined evaluation of data obtained on the basis of different measuring methods minimizes the problem of singular, local solutions, i.e. the determination of the defect geometry is more robust.

If the comparison between the reference data sets and the respective expert prediction data sets of an expert routine shows that these, possibly as described above, are closer to the reference data sets than the previous initial prediction data sets, depending on a fitness function, then the associated expert defect geometry is used as the initial defect geometry for the others as well as for the respective expert routine. Based on this solution, this geometry is started in a next iteration step, unless another expert routine has, for example, found another, once again better solution while its own defect geometry determination is still in progress, which is then made available to other or all expert routines.

In the case of the expert routines that are particularly competing with one another, preference is given to those with respect to the resources available to the EDP unit which, as described below, are more successful in approximating the real measurement data than other competing expert routines. Resources of the EDP unit are particularly the CPU or GPU time and/or the prioritization in memory allocation.

The expert routines (on the EDP unit) advantageously run in competition with one another in such a way that the distribution of the resources of the EDP unit, particularly in the form of computing time, to a respective expert routine as a function of a success rate, particularly the number of the initial defect geometries calculated by the expert routine and made available to one or more other expert routines is taken into account, and/or takes place as a function of a reduction in a fitness function in which particularly the number of expert prediction data sets generated for the reduction is taken into account. The competition between the expert routines results particularly from the fact that the program part designed as a monitoring routine then increasingly allocates resources to the respective expert routines, particularly in the form of computing time, preferably CPU or GPU time, if these are more successful than other expert routines. An expert routine is successful when it has found a defect geometry provided, for example, with a simulated EMAT measurement that is more suitable to the reference data set and is made available to the other expert routines.

From this it can emerge, for example, that individual, particularly successful expert routines receive more than 50% of the total available computing time, which significantly reduces the overall duration of the method according to the invention. At the same time, the program can specify that none or some of the expert routines do not reach a specific percentage of computing time to avoid the problem of singular and exotic defect geometries or results from the individual routines. In the event that a previously successful expert routine only finds a local and not a global solution, a way can be found out of the blocking situation that otherwise occurs in the prior art.

The adjustment by means of the expert routines takes place until an expert stop criterion is met. This criterion is, for example, a residual difference with respect to the measured and simulated measurement data. It can also be an external expert stop criterion, for example based on the available computing time or a particular predeterminable number of iterations or a particular predeterminable or predefined computing time or a computing time determined from the available computing time. The expert stop criterion can also be a combination of these criteria.

It has been found that the accuracy of the defect determination is qualitatively improved by this method. A calculation of the maximum load capacity resulting from this shows that pipelines, for example, can be operated for a much longer time. The accuracy of the defect determination is significantly increased. Maximum operating pressures resulting from the simulated defect geometry according to the method described above and below can be set by at least 10%-20% and particularly by up to 50% higher, which significantly reduces the maintenance and servicing costs for the operation of the pipeline and its operator. For the first time, an adequate determination of the ASME B31G-2012 level 2 approach ("river bottom profile") for the "remaining strength algorithm" can now also be implemented for MFL data sets.

In a further development according to the invention of the method a load limit of an object is determined that is under pressure at least during operation and particularly designed as an oil, gas, or water pipeline, wherein the method uses a data set describing one or more defects as an input data set is used in a calculation particularly designed as a forward modeling of the load limit, wherein the input data set is initially generated according to the method described above or below for determining the geometry of a defect. The advantageous representation of the defect geometry, particularly as a non-parameterized real three-dimensional geometry or as a two-dimensional surface with respective depth values, makes simplifications previously assumed to be necessary in the industry superfluous, such that for this reason, too, an increase in the accuracy of the defect determination as a whole has not been ensured in an attainable manner.

If accuracy was previously limited to the specification of the point of the maximum depth of the defect, the entire profile is now determined with high accuracy. Typically, the accuracy of the maximum depth is reduced to the level that can be achieved depending on the measurement accuracy, i.e. approximately +5% of the wall thickness compared to previously approximately ±10% of the wall thickness in the case of sizing according to the prior art described above. However, the prediction of the load limit, depending on the geometry of the defect, achieves increases in accuracy from, for example, previously ±50% to now ±5%, particularly for critical cases. The advantage according to the invention thus lies particularly in an adequate representation of the defect geometry, which is achieved for the first time and which precisely enables this increase in the first place.

BRIEF DESCRIPTION OF THE DRAWINGS

The invention relates to a method for determining the geometry of a metallic, in particular magnetizable object, in particular a pipe or a tank.

DETAILED DESCRIPTION OF THE DRAWINGS

Figure 1:
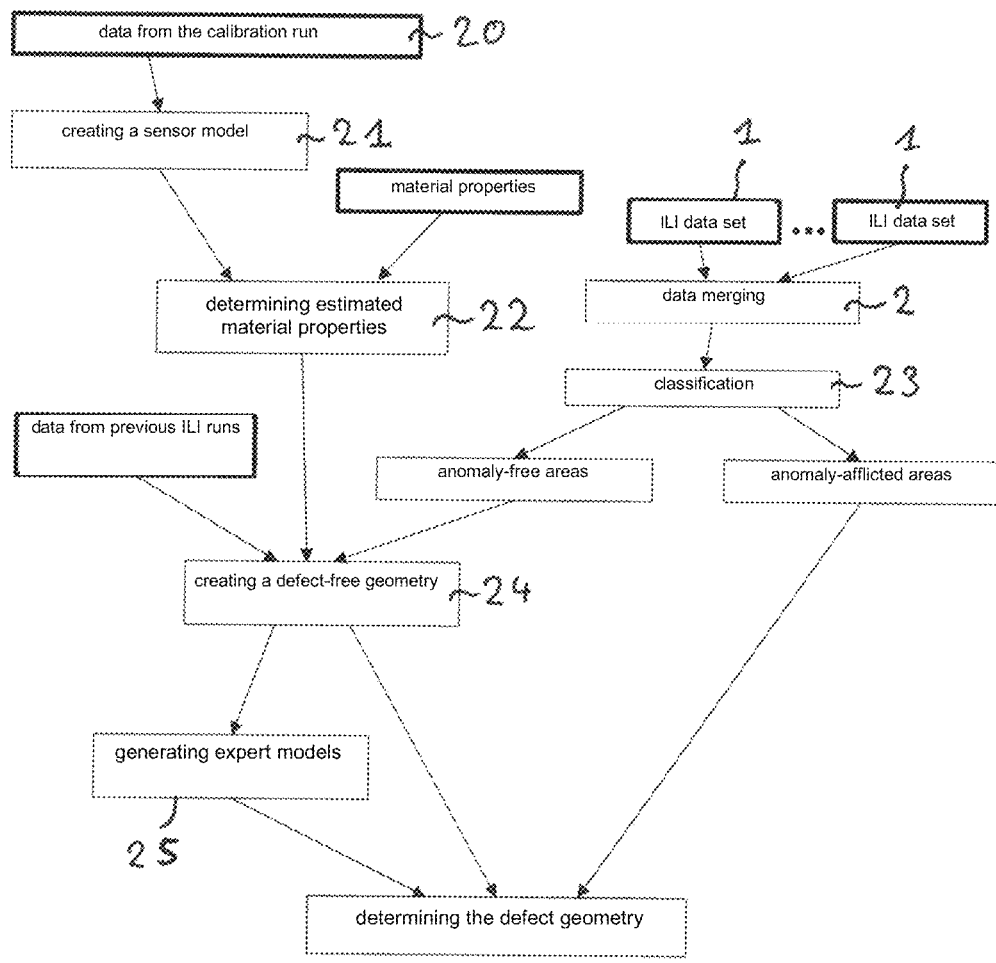
FIG. 1 shows a flowchart for a determination of an object grid representing the defect-free object.

FIG. 1 shows the flow chart of a possible implementation of the method according to the invention. A model for the non-destructive sensor 21 is created based on measurement data 20 from one or more calibration measurements with a non-destructive measuring method on a calibration object of known geometry, particularly with defects of known geometry. This is required for the simulation of measurement data or reference data sets. A simulation routine is set up in step 22 with an assessment of the relevant material properties of the examined object. This can be done by specifying known parameters that represent the material properties and properties of the sensor used. Alternatively or additionally, the parameters can be iteratively adjusted until the results of the simulation routine for the non-destructive measuring method used, based on the known geometry of the calibration object, match the measurement data of the calibration measurement with sufficient accuracy. The simulation routine can also be prepared and reused for multiple measurements using the non-destructive measuring method.

One or more reference data sets are created on based on one or more measurements with one or more non-destructive measuring methods. In step 2, FIG. 1 shows the creation of a reference data set based on the data sets 1 of multiple measurement runs. A classification into anomaly-free areas and anomaly-afflicted areas is carried out in step 23 based on the reference data set. By using two or more reference data sets that were obtained based on different non-destructive measuring methods, the classification can be improved again, since individual measuring methods are more sensitive to specific defects than to others.

An object grid representing the intact geometry of the object is created in step 24 based on the anomaly-free areas and using the simulation routine. For this purpose, information from previous measurement runs in the object with no or fewer defects can also be used. The object grid can be created in the anomaly-free areas and then completed by extrapolating and/or interpolating into the anomaly-afflicted areas. It is also conceivable to carry out an interpolation and/or extrapolation based on the reference data sets from the anomaly-free areas into the anomaly-afflicted areas.

Figure 2:
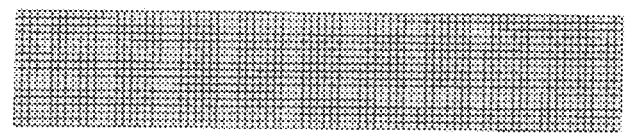
FIG. 2 shows an object grid representing the defect-free object.
Figure 3:
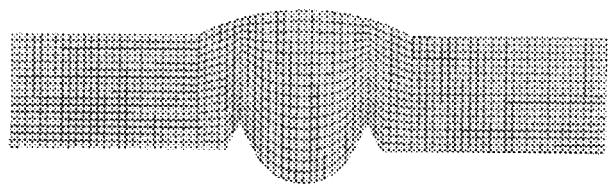
FIG. 3 shows an object grid representing the defect-free object in the area of a weld seam.
Figure 4:
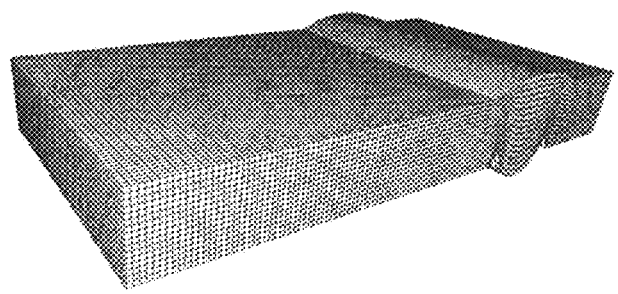
FIG. 4 shows the object grid according to FIG. 3 in a 3D representation.

The object grid is created in step 24 using an iterative process. A first initial object grid is guessed or, for example, specified based on an estimated object geometry. This is adjusted in an iterative process. For example, an initial object grid can be an object grid shown in FIG. 2. If the examined object exhibits a weld in this region, an iterative adjustment of the initial object grid will occur until it has a shape representing the weld, as shown in FIG. 3 and FIG. 4. This adjustment can be done by mesh morphing, i.e. adjusting the initial object grid by moving individual grid points.

Figure 5:
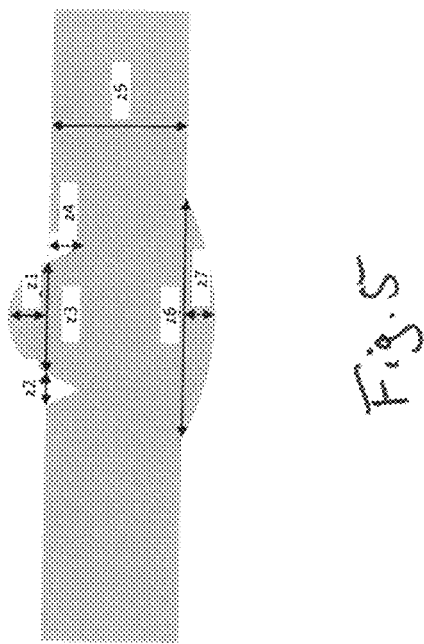
FIG. 5 shows a parametric geometry model for the representation of the object in the area of a weld.

A parametric description of the weld seam by means of a parametric geometry model can in particular also be used to accelerate the method. FIG. 5 shows such a parametric geometry model. In this model, the shape of the weld seam is described by a small number of parameters, in this case seven. The parameters describe the wall thickness of the object ($z_5$), the respective extension of the weld seam on both sides ($z_3$, $z_6$), the weld seam elevation ($z_1$, $z_7$), as well as the width and depth of notches on the weld seam ($z_2$, $z_4$). The object grid can thus be changed in the area of the weld seam by adjusting a small number of parameters. In this case, previously known information about a general shape of an object area, here a weld seam, is used. Additional boundary conditions can be specified for individual parameters. This rules out physically nonsensical or impossible results. In FIG. 5, for example, the parameters $z_2$, $z_3$, $z_5$ and $z_6$ cannot reasonably be negative, $z_4$ cannot reasonably be greater than $z_5$, etc. The parameter values can be determined by the following optimization problem:

$$\{z_1 \ldots z_n\} = \arg\min \sum_i |Y_{cal}^i(z_1 \ldots z_n) - Y_m^i|$$

under boundary conditions for $\{z_1 \ldots z_n\}$ wherein $Y_m^i$ is the measured signal of the i-th measurement, $Y_{cal}^i$ is the calculated signal for the i-th measurement. Values for the parameters can be determined using derivative-free optimization algorithms, for example by means of random search. The parameters can be changed in fixed steps, preferably defined as a function of the wall thickness, to accelerate the method. For example, a change can be made in steps that are 1% of the wall thickness.

Figure 6:
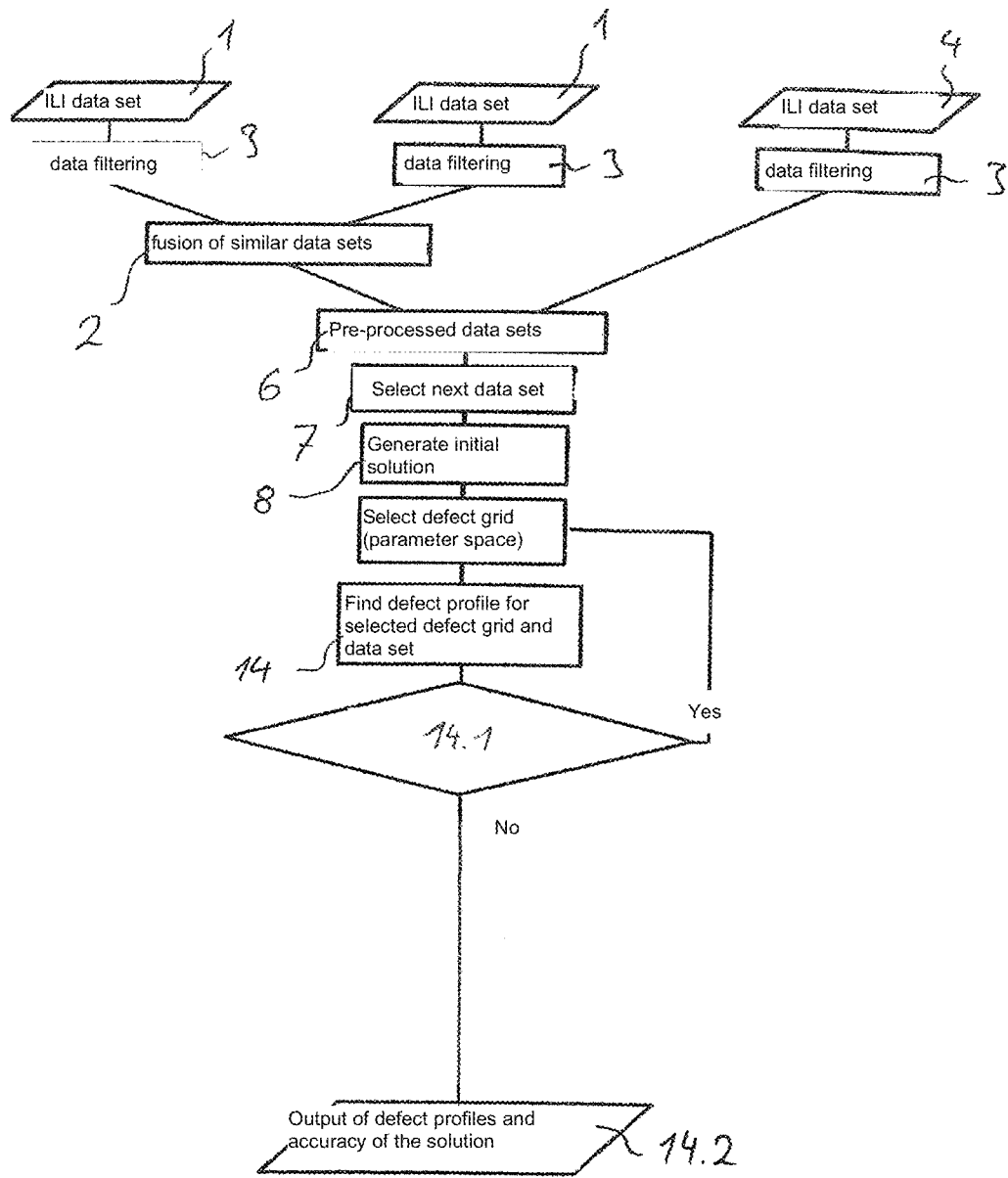
FIG. 6 shows a schematic representation of a further development of the method according to the invention.

The process sequence according to the invention is described at least in sections below according to FIG. 6, wherein a plurality of the parallel and competing expert routines 11 are described as having only one block 14.

For example, several runs of the same MFL pipeline pig can be combined as input data sets according to box 2. Both data sets 1 can be filtered beforehand for the purpose of better merging and adjusted to one another (method step 3), for example to reduce any artifacts or background noise. In addition, another data set 4 is processed based on another measuring method as an additional reference data set in the associated box 3 and filtered for the purpose of matching to identical grid structures, such that, according to method section 6, two matched reference data sets are available that were created on the basis of different non-destructive measuring methods.

Data sets that are precisely matched to one another can be treated jointly, wherein the method according to the invention implements the simultaneous treatment of the data sets by using a fitness function that takes into account the data sets to be considered together.

In step 7, the reference data sets present in step 6 are accessed, for which purpose a starting defect geometry is first determined as the initial defect geometry in step 8. As described above, this takes place based on a neural network into which the reference data sets are read as input data sets.

The solution of the neural network is then made available as one or more initial defect geometries $x_1 \ldots x_n$ to the individual expert modules. In advance, the number of parameter values that describe the defect geometries can be kept as small as possible, with the aim of reducing computing time. This is achieved, for example, by a dynamic grid adjustment. Since the number of depth values corresponds to the number of node points in the defect grid 5, the number of nodes can at the same time also be the number of defect parameters. Starting with a comparatively coarse grid, this is gradually refined in relevant areas.

The refinement shown in the relevant grid area in FIG. 5 can be achieved for an exemplary specified node point distance of 14 mm, an associated grid cell size of 14 mm×14 mm, and defect limit values of 30%, 50%, and 80% of the wall thickness, for example, wherein those cells that exceed the above depth values are successively subdivided. The grid deformation then correlates with the assumed defect geometry, i.e. in areas of large gradients there is a larger number of grid points.

After a defect grid made available centrally to all expert routines has now been selected, a new expert defect geometry is then calculated in step 14 for specific defects in the respective expert routines, and it is checked under 14.1 whether this needs to be made available to the other expert routines. This is the case if, for example, a fitness function has been improved as described above and no stop criterion has yet ended the defect finding process. In this case, the iteration continues with the defect geometry or geometries made available to all expert routines. Otherwise, the method is ended in 14.2. with the determination of the defect geometries and, in particular, the specification of the accuracy of the solution. In addition, the burst pressure can be calculated based on the defect geometries found.

Figure 7:
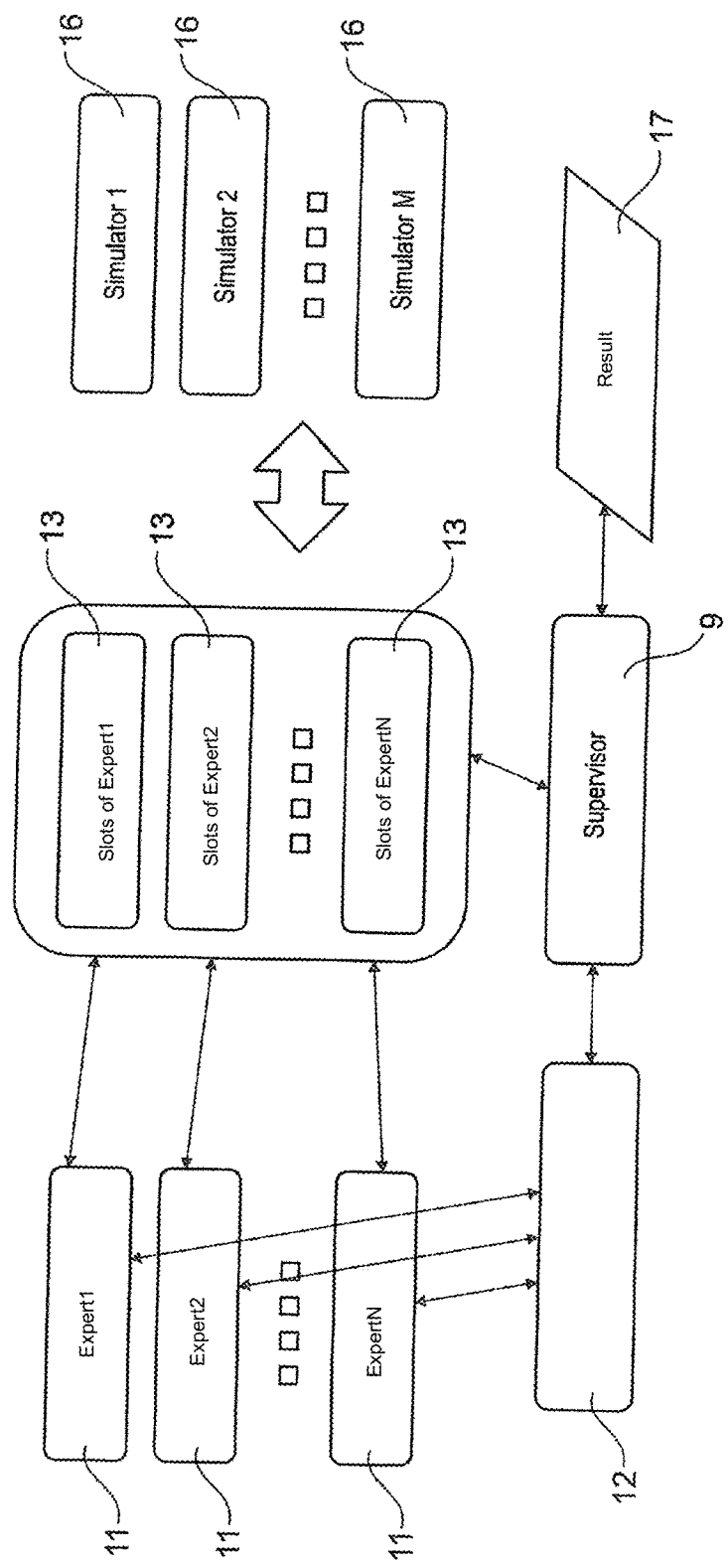
FIG. 7 shows a more detailed explanation of a portion of FIG. 6.

According to the method according to the invention, the sequence of the work flow of a group of expert routines 11 which are in competition with one another is simulated on the EDP unit. For this purpose, the program can have various modules which can set data in specific areas of the EDP unit independently of one another and particularly not synchronized with one another, so that they can be further processed there. This particularly takes place under the supervision of a monitoring routine 9 (FIG. 7). A plurality of expert routines 11 thus hold a number of computation slots 13 depending on the success defined above, i.e. for example the number of initial defect geometries written in a common memory area 12, to generate expert defect geometries and/or to be able to carry out associated MFL simulations or, in the case of an independent MFL simulation module, to have these simulations carried out. This corresponds to block 14 according to FIG. 6, wherein this block is an example of multiple expert routines 11 (FIG. 7). According to the present exemplary embodiment, the simulations of the measurement data that match the individual expert defect geometries are carried out based on the individual computation slots 13 in the simulation modules 16 for the purpose of creating the expert prediction data sets, also under the supervision of the monitoring routine 9. The more slots 13 are available for an expert routine, the greater the proportion of IT resources available to this expert routine. The number of program modules provided for carrying out simulations is preferably equal to the number of slots. The monitoring routine 9 monitors the number of iterations and the resulting changes in the initial defect geometry and further monitors whether an associated stop criterion has been reached. The result according to block 17, which corresponds to block 14.2 from FIG. 6, is then output.

The number of computation slots 13 available to an expert routine 11 and the simulation routines subsequently made available can vary in such a way that a first expert routine, for example, can utilize up to 50% of the total available for the computation slots and computing time available to simulation routines.

As shown, the initial defect geometries are stored in the memory area 12. This can be a memory area accessible to the expert routines 11. Log files of the expert routines 11 and monitoring routine 9 as well as instructions to the expert routines 11 can also be stored there, which are then independently implemented by them. For example, this can be an interrupt command that is set when the stop criterion is reached.

The expert routines 11 are preferably independent program modules which generate new expert defect geometries and place them in the simulation routines 16. Furthermore, the fitness function presented at the beginning can be generated in the expert routines 11 based on the expert prediction data set and compared to the initial prediction data set stored in the area 12. If the expert prediction data sets are overall more similar to the reference data sets than the data sets stored in area 12, these expert prediction data sets are then used as new initial prediction data sets.

For example, a new defect geometry is generated randomly in the expert routines 11. Machine learning algorithms or empirical rules can be used for this. Advantageously, however, the implementation of at least two basic expert routines working in a defect-specific manner based on the type of defect is provided to further improve the convergence of the solutions, as described below.

These search strategies, which are preferably always implemented in a method according to the invention, are based on an assumed probability distribution p (x, y) of grid points, the depth value of which results in a maximum reduction in the fitness function to determine a corrosion-based defect geometry. The probability function is used to identify N grid points $(x_n, y_n)$. Instead of grid points $x_n$, $y_n$, the parametric representation of the group of defects $(x_1 \ldots x_n)$ already used above can be assumed as the subject of the probability distribution, with N grid points (x, y) or $(x_n, y_n)$.

At each of the points under consideration, the depth function, which in the present case describes the depth D of the corrosion at the grid point, is changed by ΔD, wherein the sign of the change is distributed randomly. The number of selected points N can also be chosen randomly:

$$D_{new}(x, y) = \begin{cases} D(x_n, y_n) \mp \Delta D, & \text{for selected points} \\ D(x, y), & \text{otherwise} \end{cases}$$

When selecting the probability function p (x, y), different expert strategies can be implemented, for example:

$$p(x, y) = \frac{D(x, y)}{\|D(x, y)\|}$$

This algorithm implements a variation of the defect depth, in which the grid points with the greatest depth are preferred. Another strategy for a corrosion-based development of the expert defect geometry may be as follows:

$$p(x, y) = \frac{H_{the\ best}(x, y) - H_m(x, y)}{\|H_{the\ best}(x, y) - H_m(x, y)\|}$$

Such an algorithm varies the defect geometry at positions at which the simulated MFL measurement signal $H_{the\ best}$ has the greatest difference to the measured signal $H_m$ for the best known solution.

On this basis, different expert routines or their algorithms can be set up by varying the number of grid points to be considered and the ΔD. As an example, the following six expert routines can be used for the development of corrosion-based defects:

1. $p(x, y) = \frac{D(x, y)}{\|D(x, y)\|}$, $N = 1$ and $\Delta D = 1\%$ wall thickness 2. $p(x, y) = \frac{D(x, y)}{\|D(x, y)\|}$, $N = 2$ and $\Delta D = 5\%$ wall thickness 3. $p(x, y) = \frac{D(x, y)}{\|D(x, y)\|}$, $N = 3$ and $\Delta D = 5\%$ wall thickness 4. $p(x, y) = \frac{H_{the\ best}(x, y) - H_m(x, y)}{\|H_{the\ best}(x, y) - H_m(x, y)\|}$, $N = 1$ and $\Delta D = 1\%$ wall thickness 5. $p(x, y) = \frac{H_{the\ best}(x, y) - H_m(x, y)}{\|H_{the\ best}(x, y) - H_m(x, y)\|}$, $N = 2$ and $\Delta D = 5\%$ wall thickness 6. $p(x, y) = \frac{H_{the\ best}(x, y) - H_m(x, y)}{\|H_{the\ best}(x, y) - H_m(x, y)\|}$, $N = 3$ and $\Delta D = 5\%$ wall thickness The following functional rules can be used for an expert routine that is suitable for the variation of a crack-based defect:
- the depth of the defect is randomly reduced or increased by a specific amount, preferably e.g. 1 or 2% of the wall thickness of the object,
- the position of all points of the crack is varied in a randomly selected direction, and/or
- a line describing the crack is lengthened or shortened by the position of the grid nodes on the object grid or defect grid.

An expert routine that describes a laminating defect can work according to the following functional rules:
- on the basis of the 2D parameter description of a laminating defect, the values associated with the grid nodes are varied step by step by 5% in one direction or the other with the aim of varying the position of the lamination; this can only be done for a subset of the known of the 2D description of the lamination, randomly selected points (grid nodes) with values not equal to zero, which are in the vicinity of points with values of zero, can be set to zero (reduction of the extent of the lamination), randomly selected grid points with values of zero, which are located in the vicinity of grid points with values not equal to zero, can be set to the corresponding neighborhood value, whereby the lamination is increased, and/or all values in the grid can be moved in a randomly selected direction, which is accompanied by a change in the position of the lamination along the pipeline surface.

As described, the monitoring routine 9 shown in FIG. 7 particularly has two functions: On the one hand, it checks if the stop criterion is reached, on the other hand, it allocates the resources of the EDP unit between the individual experts based on their successes. A measure of success is $$P = \frac{\Delta F}{N},$$

wherein $\Delta F$ is the reduction of the fitness function F by the result of the respective expert routine, and in this case N is the number of simulations required for this. An assessment of the n expert routines can be assumed as $$R_n = \frac{P_n}{\sum P_i}.$$

The number of computation slots $N_S$ for an expert routine in one iteration then is $N_S = \text{int}(R_n N_{all})$,
wherein $N_{all}$ is the number of all available slots.

The respective non-destructive measurements for the expert defect geometries are simulated in the simulation routines 16. An expert routine can iterate until it finds a solution whose expert prediction data sets are better than the initial prediction data sets stored in area 12. If this is the case, the expert routine 11 can attempt to achieve other better solutions on the basis of the already improved solution.

A resulting error E for the individual observations of the simulated and measured data sets can result from the errors of the respective data sets in the individual calculations:

$$E = \Sigma_i \|Y_{cal}^i(D) - Y_m^i\|,$$

wherein Ym and Ycal represent the above-described respective measured and simulated measuring fields at the defect geometries (x1 ... xn).

Based on the method according to the invention, the condition of a pipe and thus the pressure that can be specified for safe operation of the pipeline can be specified much more realistically, while operational reliability is still ensured. Such a result can be made available to the pipeline operators more quickly than, or at least in the same evaluation time as, in the prior art using the method according to the invention with the expert routines competing for resources of the EDP unit.

The invention claimed is:

1. A method for determining a geometry of a metallic object with one or more real, examined defects, with a reference data set of the object generated on the basis of at least one measurement by at least one non-destructive measuring method, the method comprising the steps of:

performing a classification of anomaly-free areas and anomaly-affected areas of the object on the basis of at least parts of the at least one reference data set, creating an initial object grid, calculating a prediction data set of the at least one non-destructive measuring method by a simulation routine using the initial object grid, performing a comparison of at least parts of the prediction data set to at least parts of the at least one reference data set, excluding the anomaly-afflicted regions, and, depending on at least one accuracy measure, using the initial object grid as an object grid describing the geometry of the object, or performing an iterative adjustment of the initial object grid to the geometry of the object in the anomaly-free regions by means of an electronic data processing ("EDP") unit, wherein a new initial object grid is created during the iteration and for this a new prediction data set is calculated by the simulation routine, and a comparison of at least parts of the new prediction data set to at least parts of the at least one reference data set is performed, excluding the anomaly-afflicted regions, until a stop criterion is present and the initial object grid then present is used as an object grid describing the geometry of the object.

2. The method according to claim 1, wherein information of the reference data set and/or object grid is interpolated or extrapolated from the anomaly-free areas into the anomaly-affected areas.

3. The method according to claim 1, wherein the simulation routine is set up by presetting parameters representing material properties of the object, the geometry of a sensor used in the non-destructive measuring method, the distance of the sensor from the object surface, and/or operating conditions of the sensor.

4. The method according to claim 1, wherein the classification is performed based on at least parts of at least two reference data sets obtained by different non-destructive measuring methods.

5. The method according to claim 1, wherein a first reference data set generated based on an MFL measuring method and at least one other reference data set generated based on an eddy current, EMAT, or ultrasonic measuring method are used.

6. The method according to claim 1, wherein an anomaly-free area is assigned to a predefined local element of the object during the classification and this element is used in the creation of the initial object grid or inserted into the initial object grid.

7. The method according to claim 6, wherein the local element is described by means of a parametric geometry model.

8. The method according to claim 7, wherein a change of at least one parameter of the parametric geometry model is performed during the iterative adjustment of the initial object grid.

9. The method according to claim 1, wherein the iterative adjustment of the initial object grid is performed by grid modification.

10. The method according to claim 1, wherein the initial object grid is created by calculating a new grid within a changed contour of the initial object grid in the iterative adjustment of the initial object grid.

11. The method according to claim 1, wherein the object grid is used to determine defect geometries in the anomaly-afflicted regions.

12. The method according to claim 11, further comprising the steps of:
- determining the geometry of one or more real, examined defects of the metallic object by means of at least two reference data sets of the object generated on the basis of different, non-destructive measuring methods,
- displaying the object at least partially on or through the at least two-dimensional object grid in an EDP unit,
- determining at least one starting defect geometry as the starting defect geometry,
- determining respective prediction data sets as initial prediction data sets on the basis of the initial defect geometry by simulation or assignment of a measurement that matches the respective reference data set,
- iteratively adjusting the initial defect geometry to the geometry of the real defect(s) by means of the EDP unit and by means of at least one competing expert routines,
- generating a respective expert defect geometry in the respective expert routine(s) by means of at least one own algorithm and based on the initial defect geometry,
- determining respective expert prediction data sets based on the respective expert defect geometry by simulation or assignment of a measurement that matches the respective reference data set,
- making available the expert defect geometry on which the respective expert prediction data sets are based to at least one of the expert routines as a new initial defect geometry for further adjustment to the geometry of the real defect(s), if the expert prediction data sets of a respective expert routine are more similar to the respective reference data sets than the initial prediction data sets and/or a fitness function that takes into account the at least two expert prediction data sets is improved,
- and then using the expert prediction data sets belonging to the new initial defect geometry as new initial prediction data sets,
- wherein the iterative adjustment by means of the expert routines takes place until a stop criterion is met.

13. The method according to claim 12, wherein a data set based on an MFL, eddy current, EMAT, or ultrasonic measuring method is used as the first reference data set, and a data set generated based on another measuring method from this group of measuring methods is used as at least one other reference data set.

14. The method according to claim 12, wherein the expert routines run in competition with one another in such a way that the resources of the EDP unit to a respective expert routine are distributed as a function of a success rate, and/or as a function of a reduction in the fitness function.

15. A method for determining a load limit of the object that is under pressure at least during operation, wherein a data set describing one or more defects is used as an input data set in a calculation of the load limit, wherein the input data set is generated first according to a method according to claim 1.

* * * * *